June 13, 1939.   T. T. GOLDSMITH, JR   2,162,009
CATHODE RAY CYCLOGRAPHIC BRIDGE BALANCE INDICATOR
Filed Dec. 16, 1937    2 Sheets-Sheet 1

INVENTOR.
Thomas Toliver Goldsmith, Jr.
BY
Darby & Darby
ATTORNEYS

June 13, 1939.　　T. T. GOLDSMITH, JR　　2,162,009
CATHODE RAY CYCLOGRAPHIC BRIDGE BALANCE INDICATOR
Filed Dec. 16, 1937　　2 Sheets-Sheet 2
Fig. 2
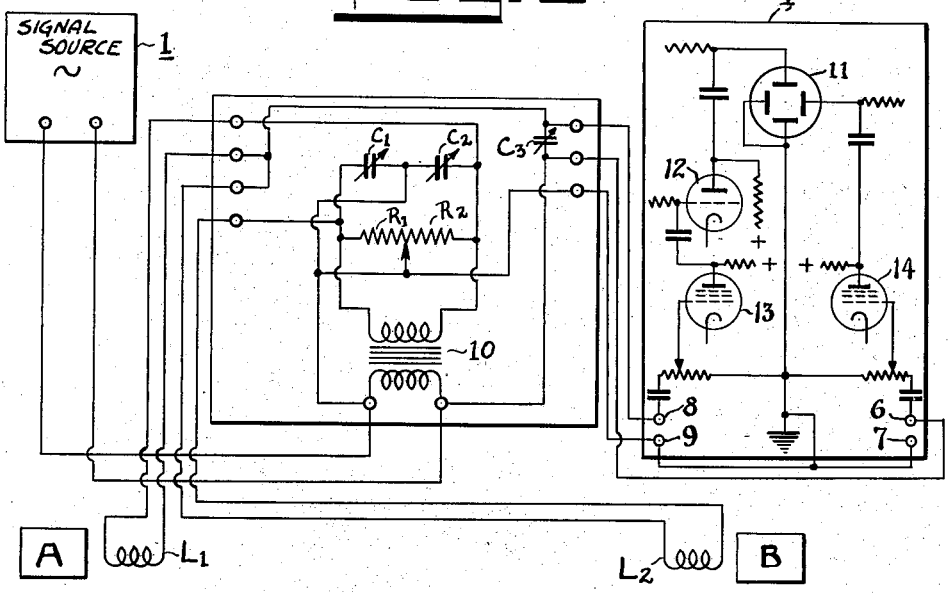
Fig. 3　　Fig. 3-A
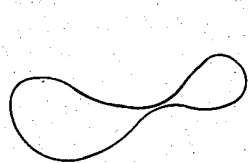　　
Fig. 4　　Fig. 4-A
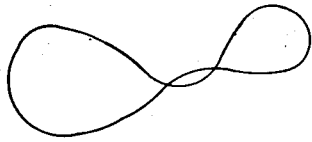　　
INVENTOR.
Thomas Toliver Goldsmith, Jr
BY
　Darby & Darby
ATTORNEYS Patented June 13, 1939

2,162,009

UNITED STATES PATENT OFFICE 2,162,009

CATHODE RAY CYCLOGRAPHIC BRIDGE BALANCE INDICATOR

Thomas T. Goldsmith, Jr., Montclair, N. J., assignor to Allen B. Du Mont Laboratories, Inc., Upper Montclair, N. J., a corporation of Delaware Application December 16, 1937, Serial No. 180,167

16 Claims. (Cl. 175—183)

This invention relates to a means for comparing samples of material, wherein it is desired to detect very small differences between the samples. The invention is applicable to materials having characteristic magnetic qualities, dielectric qualities, or conductivity qualities or any other specific qualities which are capable of being indicated by means of an electrical bridge network.

An object of the invention is to provide a more sensitive means of detecing slight differences between samples, by making use of the cathode ray oscillograph as the balance indicator, this oscillograph showing up distinctly the phase relations as well as the amplitude relations of the bridge voltages when the samples are subjected to test.

Another object of the invention is to provide a simple cyclographic pattern which is at once easy and simple for quick observation, yet very sensitive in its indication of small differences between samples.

Another object of the invention is to provide equipment which in principle can be employed for the testing of a wide variety of samples. The principle shows differences in permeability of magnetic materials, which differences may be caused by slight variations in processing or in chemical composition. It shows differences in conductivity of materials such as equal sized pieces of copper and brass. It shows differences in the dielectric properties of poor conductors, such as synthetic resins, rubber and the like.

Another object of the invention is to provide a means for testing the samples such that the samples are in no way injured by the treatment. The method employed requires only that the samples be placed in proximity to the equipment, forming part of the inductive circuit or the capacitive circuit. Thus the manipulative procedure is very simple and lends itself readily to automatic operation for separation within tolerance limits of production.

A feature of the invention is the use of two variables on the null balancing indicator, which therefore greatly increases the precision in determining the exact similarity of two samples. The indicator is a cathode ray tube, on the face of which appears a cyclogram produced by a combination of the input and the output voltages of the bridge network. For convenience, though other means might be employed, a portion of the input voltage to the bridge circuit is applied to the horizontal deflecting plates of the well known cathode ray oscillograph. Then the output signal of the bridge circuit, suitably amplified, is applied to the vertical deflecting plates of the oscillograph. In this way a relatively simple, yet very sensitive cyclogram is produced.

Another feature of the invention is the introduction of unconventional coupling between the input and the output signals of the bridge circuit, thereby producing a cyclogram in which there are intersecting or osculating portions of the curve, providing within itself distinct reference points, small shifts of which are readily observed. This feature also provides the advantage of showing the sense or direction of deviation from the standard pattern, a factor which is difficult to determine in the conventional bridge circuits where meters or head phones are employed simply to show the null balance to zero amplitude. This purposeful introduction of unconventional coupling can be made to cause an asymmetry of the pattern such that the sense of deviation can be made very positive.

Another feature of the invention is that while the method is applicable for detecting very small differences between samples, it is nevertheless quite variable in sensitivity so that it may be employed equally well in testing or sorting samples where a wide tolerance is allowable.

Another feature of the invention is the wide applicability of its principles with regard to frequency, so that those frequencies most suitable or critical for the specimen under test may be employed.

Another feature of the invention is that selective frequency filters may be employed so as to choose those characteristics of the cyclogram which are most variable with the small difference between the samples, and thus extraneous and undesirable complication of the pattern may be avoided.

A valuable feature of the invention is that the horizontal deflection on the indicating cathode ray oscillograph employs a fundamental frequency of the bridge and therefore the pattern is of the so-called stationary variety and remains in synchronism when varying the bridge frequency. However, the use of the oscillograph allows simple switchover so that a linear time base may be employed where an analysis of the wave form of the bridge output is desired.

While the following description of the equipment will outline a specific device for testing samples for variations in magnetic permeability, it will be understood that detailed variations in the nature and form of the test impedances may be made to make them most suitable for the particular application in mind. The fundamental aim is to choose those characteristics available from the general principles which will give the most sensitive, or in some cases sufficiently sensitive, indication of the sample variation.

The chief advantage of this invention is that provision is made whereby both phase and amplitude relations may be indicated on a relatively simple cyclogram to give very sensitive indications. It utilizes the great flexibility, and takes advantage of the unlimited frequency range, of the cathode ray tube.

This device and numerous other ones employing the same basic principles should have large application in production, and in laboratory testing, where it is desired to test materials for similarity within specified tolerance limits. The following detailed description of circuits is merely suggestive of a single specific application, but one well versed in the art can at once see that the principles are applicable to many general cases.

In the drawings—

Fig. 2 shows a more detailed circuit illustrating a particular application of the device;

Fig. 3 shows a cyclogram as it would appear on the cathode ray tube, indicating an identical sample;

Fig. 3A shows the wave form of Fig. 3 as it would appear plotted on a linear time base;

Fig. 4 shows a cyclogram as it would appear on the cathode ray tube, indicating a faulty sample;

Fig. 4A shows the wave form of Fig. 4 as it would appear plotted on a linear time base;

Fig. 5 shows a cyclogram of Fig. 3 which would be produced if the output and input bridge circuits were not coupled; and Fig. 6 shows a cyclogram of Fig. 4 which would be produced if the output and input bridge circuits were not coupled.

Figure 1:
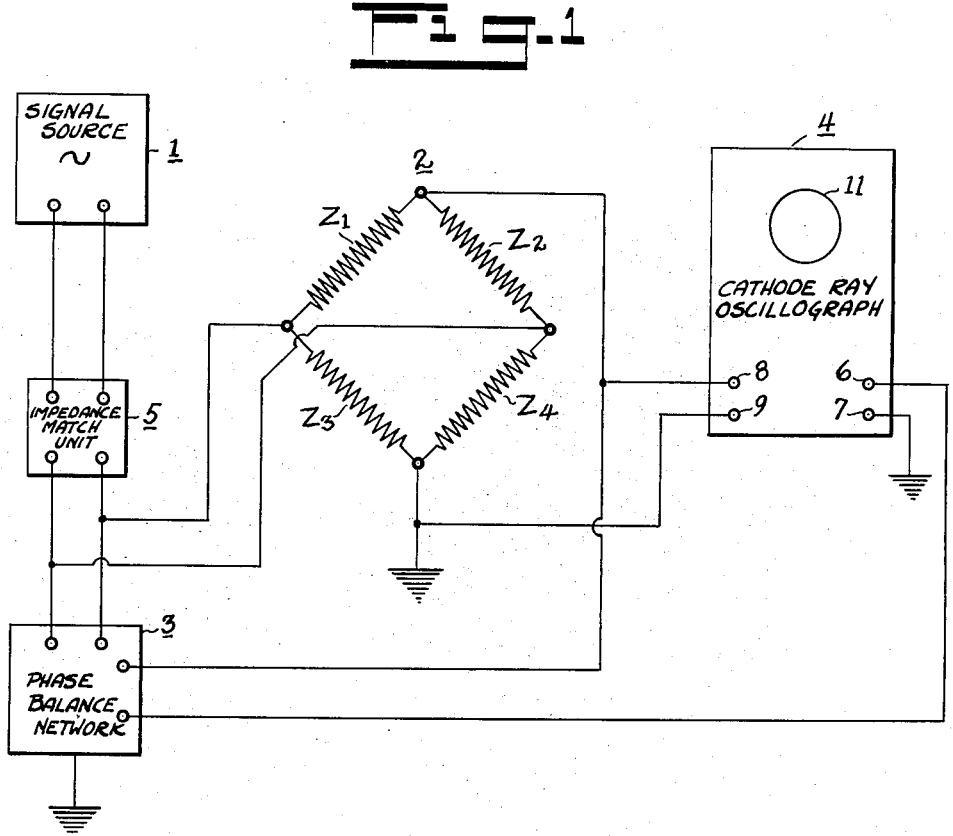
Figure 1 shows a generalized circuit of the device.

In Figure 1 a signal source 1 delivers an alternating potential of audio or radio frequency to the specialized bridge 2 which has the special phase shifting and balancing networks 3, and thence the potentials are delivered to the oscillograph 4 where the characteristic cyclogram is produced.

The impedances $Z_1$, $Z_2$, $Z_3$ and $Z_4$ may take the form of resistance, inductance or capacitance, or else combinations thereof. One or more of these impedances is so chosen that it may be influenced easily by the samples under test. For example, $Z_3$ and $Z_4$ could take the form of inductances when testing samples with magnetic permeability variations, or with slight differences in eddy current losses. Then the samples would be introduced in such a way as to modify the inductive circuit in a sensitive manner. The shape and magnitude of the inductance would depend somewhat on the particular sample under test, though it is found that a particular inductance may be used for a wide variety of samples. Again, $Z_3$ and $Z_4$ may take the form of capacitances in cases where the samples have variable dielectric properties, the sample being introduced to affect the capacitance. The affected impedance may take any one of the four impedance positions, depending upon the particular application. In some cases it might prove of advantage to insert the sample by direct connection in the bridge circuit, where conductivity variations are adequate in determining tolerance limits between samples. The so-called impedance match unit 5 consists of a signal isolating unit, such as a transformer, followed by a device such as a Wagner grounding network. The phase balance network 3 delivers a signal of controllable phase and amplitude to the horizontal deflecting plates of the oscillograph through the terminals 6, 7. It can also be used to introduce harmonics in the waves so as to produce intersection points in the cyclograms, which intersection points prove of great value by providing self-indexing reference points for visual observation. The phase balance network also provides a signal of variable amplitude and phase when it is purposely coupled to the bridge output terminals and to the vertical deflection plates through the terminals 8, 9 to assist in annulling certain unbalanced bridge voltages and to assist in producing a desirable cyclogram.

The oscillograph itself may take any one of several standard forms. It is desirable, though not necessary, that it be provided with amplifiers for both horizontal and vertical axes and a high gain is particularly desirable on the vertical axis. However, when working at the very high frequencies which would have conceivable advantage for certain dielectric measurements, it may prove best to make connection direct to the deflection plates.

Fig. 2 shows the detailed circuit of a device designed particularly for the comparison of samples of magnetic material which showed variations of permeability with the chemical composition, particularly the nickel content. Specifically, this particular circuit has been used successfully to test the nickel content of ball bearing races. In this particular case the races with too little nickel were found to be defective because they were too soft. As the nickel content also affected the permeability, this circuit and apparatus permitted a very rapid test to eliminate those that were defective.

The resistors $R_1$ and $R_2$ serve at once as two arms of the bridge and as a part of the Wagner ground network. Condensers $C_1$ and $C_2$ assist in the provision of the Wagner ground and in adjusting the bridge arms to produce the suitable cyclogram. Inductances $L_1$ and $L_2$ are coils comprising the other two bridge arms and their inductances are varied by proximity to the samples under test. The condenser $C_3$ provides a small coupling between the bridge input and the bridge output to produce a shift of phase and a harmonic introduction which will develop a more sensitive and more easily interpreted cyclogram. In the apparatus of Fig. 2 condenser $C_3$ acts as the phase balance network 3 of Fig. 1, and the transformer 10 as the impedance match unit 5.

Selective frequency filters may be used to advantage. The test circuit may be tuned to the 3rd harmonic of the frequency applied to the bridge, to give an osculating pattern such as Fig. 3. Here the bridge may be balanced for the fundamental and the sample mainly influences the amplitude of the 3rd harmonic. The purposeful introduction of coupling between bridge input and bridge output provides adjustment so that the 3rd harmonic content with the standard sample will produce a cyclogram with central lobes that just touch.

In operation two identical samples are first placed in positions A and B of Fig. 2. The audio oscillator 1 is then adjusted for a frequency, say 3800 cycles per second. The ratio of $R_1$ to $R_2$ is adjusted to give approximately a minimum output from the bridge. The condensers, once adjusted for a convenient pattern, may be left untouched, serving mainly to aid in obtaining the most critical cyclogram. The oscillograph amplifiers are adjusted for a pattern of suitable size. A sensitive cyclogram for this particular case is found to be the just osculating figure of eight. After balancing the system for this pattern an unknown sample is substituted in the position B. If it proves to be identical with that at A, the original cyclogram will result, but if there is a difference between the samples, an at once apparent change in the cyclogram results. Fig. 3 and Fig. 4 show the characteristic patterns respectively for an identical sample and for a faulty sample. By using the signal voltage on the horizontal deflection plates the return sweep is at the same speed as the sweep, resulting in the cyclographic pattern. The pattern which would be obtained if a linear time base were used, that is, if the return sweep were approximately instantaneous, is shown in Figs. 3A and 4A, respectively, for an identical sample and a faulty sample. It will, of course, be observed that the pattern of Figs. 3A and 4A would be very difficult of interpretation, and totally useless if interpreted by an unskilled workman, while the patterns of Figs. 3 and 4 can easily be interpreted by an unskilled workman.

The effect of using the coupling condenser $C_3$ is indicated in Figs. 5 and 6 which show a pattern for an identical and faulty sample, respectively, which would result if this condenser were not used. Here again it will be noted that interpretation would be very difficult. It is therefore through the use of the coupling that an easily interpreted pattern is obtained. In some cases it is desirable to place a capacitance in parallel with each pick up coil to assist in obtaining suitable resonant conditions.

In the particular apparatus illustrated in Fig. 2, which was used to examine ball bearing races, the inductances $L_1$ and $L_2$ were each a square coil having 6000 turns of #30 wire, wound in layers having an outside diameter of two inches, an inside diameter of $\frac{3}{4}$ inch, and a length of $\frac{1}{2}$ inch. Condenser $C_1$ was variable from 10 to 50 micro-microfarads and was set at approximately 15 micro-microfarads. Condenser $C_2$ was variable from 50 to 100 micro-microfarads and was set at approximately 70 micro-microfarads. This slight unbalance between these two condensers and proper adjustment of the oscillator frequency introduced distortion which gave the self-indexing feature. That is, the unbalance was adjusted until the desired pattern, as shown in Fig. 3, was obtained and then the settings were left at this point for the examination of samples. Resistances $R_1$ and $R_2$ consisted of a 50,000 ohm potentiometer with a slider which was set at or near the center. Condenser $C_3$ was variable from 3 to 30 micro-microfarads and was set at approximately 10 micro-microfarads. The transformer 10 was a microphone transformer on which two high impedance secondaries were used. The oscillograph 4 was a standard Du Mont Type 168 oscillograph having a cathode ray tube 11 which was a standard Du Mont Type 54 XH tube. Tubes 12 and 13 are vertical amplifiers in the 168 oscillograph. Tube 14 is the horizontal amplifier. The oscillator 1 may, of course, be any standard type of radio or audio frequency oscillator, depending upon the frequency it is desired to use.

In adjusting the apparatus for the pattern that is to be selected as standard, I find that variations in the frequency and in the values of $R_1$ and $R_2$, $C_1$, $C_2$ and $C_3$, and the horizontal gain control, all affect the pattern. If, however, the condensers $C_1$, $C_2$ and $C_3$ are all set at approximately the relative values indicated above, the pattern may be secured by an adjustment of the frequency, relative resistances $R_1$ and $R_2$, and the horizontal gain control.

It will be understood, of course, that suitable holders may be used for the standard sample A and unknown sample B so that they will always have the same relative position with respect to the inductances, and so that additional samples B will all have an identical effect upon the inductance $L_2$. It will also be understood that suitable mechanism can be used for bringing the samples into position and removing them automatically after the pattern is observed. This observation may be either visual or photoelectric.

What I desire to secure by United States Letters Patent is:

1. A cathode ray cyclographic bridge balance indicator comprising a source of signal current, a bridge circuit, means for applying signals from said source to said bridge circuit, an oscillograph, means for applying the voltages from said bridge to the deflection plates of said oscillograph, means for affecting the electrical characteristics of one arm of said bridge by a standard sample, means for affecting the electrical characteristics of a second arm of said bridge by a second sample, and means for coupling the output circuit of said bridge to its input circuit.

2. A cathode ray cyclographic bridge balance indicator comprising a source of signal current, a bridge circuit wherein a balance is obtained for the fundamental frequency fed to the bridge, means for applying signals from said source of signal current to said bridge circuit, impedances in said bridge arms such that samples of materials may be introduced in a manner to affect substantially only certain chosen harmonics of the fundamental frequency, means for applying the bridge output voltage to an oscillograph, and means for applying also the fundamental frequency to the oscillograph to produce a cyclogram characteristic of the material under test.

3. The method of operating a cathode ray bridge balance indicator which comprises applying a signal current to the input of the bridge, placing a standard sample in a position where it will affect the electric characteristics of one arm of said bridge, placing an unknown sample in a position where it will affect the electrical characteristics of a second arm of said bridge, coupling the output of said bridge to its input, and applying signals from the output of said bridge to one set of deflecting plates of a cathode ray oscillograph, and applying a voltage of the input frequency to the other set of plates of a cathode ray oscillograph.

4. A cathode ray cyclographic bridge balance indicator comprising a pair of condensers connected across two arms of said bridge, and means to couple the output of said bridge to its input to introduce distortion and thereby provide a self-indexing pattern.

5. A cathode ray cyclographic bridge balance indicator comprising a source of signal current, a bridge, means for affecting the balance of said bridge by a standard sample and an unknown sample, and means for coupling the output of said bridge to its input.

6. A cathode ray cyclographic bridge balance indicator comprising means for unbalancing the bridge to introduce distortion in order to provide a self-indexing feature, and means for coupling the output to the input of the bridge circuit to provide an easily recognized pattern whereby variations in phase and amplitude at the balance point may be observed in order to determine the sense of unbalance as well as the magnitude of unbalance by simple observation.

7. A cathode ray cyclographic bridge balance indicator comprising a signal source, an impedance match unit, a phase balance network, a group of electrical impedance elements comprising a bridge, and a cathode ray oscillograph, and means for applying a portion of the current from said signal source to said oscillograph through said impedance match unit and said phase balance network and applying a portion of the current from said signal source to said oscillograph through said impedance match unit and said bridge.

8. A cathode ray cyclographic bridge balance indicator comprising a signal source, a plurality of electrical impedance elements comprising a bridge, an impedance match unit, means for applying signals from said signal source to said bridge impedances through said impedance match unit, a phase balance network, means for adjusting the phase relationships of currents in said bridge by means of said phase balance network, a cathode ray oscillograph, and means for applying the voltages from said bridge to both the vertical and horizontal deflection plates of said cathode ray oscillograph.

9. A cathode ray cyclographic bridge balance indicator comprising a signal source, a plurality of electrical impedance elements comprising a bridge, an impedance match unit, means for applying signals from said signal source to said bridge impedances through said impedance match unit, a phase balance network, means for adjusting the phase relationships of currents in said bridge by means of said phase balance network, a cathode ray oscillograph, means for applying the output voltages from said bridge to both the vertical and horizontal deflection plates in said cathode ray oscillograph, and means for amplifying said signals in said cathode ray oscillograph before applying them to the deflection plates of the cathode ray tube.

10. A cathode ray cyclographic bridge balance indicator comprising means for introducing harmonics to provide a self-indexing measure of both phase and amplitude relations at or near the bridge balance points, and means for visually indicating said relations.

11. A cathode ray cyclographic bridge balance indicator comprising self-indexing means for indicating sense of departure from the bridge balance point, and means for indicating magnitude of departure from the bridge balance point.

12. A cathode ray cyclographic bridge balance indicator comprising means for providing a simple cyclogram characteristic of magnetic samples under test, means for introducing distortion to cause said cyclogram to indicate bridge phase relations, and means for causing said cyclogram to indicate bridge amplitude relations.

13. A cathode ray cyclographic bridge indicator comprising means for providing a simple cyclogram characteristic of dielectric samples under test, means for causing said cyclogram to indicate bridge phase relations, means for causing said cyclogram to indicate bridge amplitude relations, and means for distorting said cyclogram, whereby it is caused to be self-indexing and easily interpreted.

14. A cathode ray cyclographic bridge indicator comprising means for providing a simple cyclogram characteristic of conductive samples under test, means for causing said cyclogram to indicate bridge phase relations, means for causing said cyclogram to indicate bridge amplitude relations, and means for distorting said cyclogram, whereby it is caused to be self-indexing and easily interpreted.

15. An alternating current bridge circuit in combination with a cathode ray tube indicator employing a voltage of the bridge input frequency for deflection on one axis, with the bridge output voltage, suitably amplified, on the other axis, and means for introducing harmonics of the input voltage into the output voltage, thus providing a simple and stable sweep base for observing the character of the bridge output, and means for applying said voltages to the deflection plates of said tube.

16. A cathode ray cyclographic bridge balance indicator comprising a source of alternating current, a bridge circuit of electrical elements, and a cathode ray indicating device with its amplifiers, the bridge having one arm whose electrical characteristics can be affected by a magnetic, dielectric, or conductive sample under test, and another arm with calibrated electric impedances which can be varied to restore a desired cyclogram, and means for coupling the output of said bridge to its input, thus giving a self-indexing quantitative measure of the variation between successive samples under test.

THOMAS T. GOLDSMITH, Jr.